United States Patent [19]

Park

[11] 4,161,981

[45] Jul. 24, 1979

[54] METHOD FOR RECOVERING HYDROCARBONS

[75] Inventor: Jack H. Park, Houston, Tex.

[73] Assignee: Texaco Development Corporation, White Plains, N.Y.

[21] Appl. No.: 877,150

[22] Filed: Feb. 13, 1978

[51] Int. Cl.² .................. E21B 43/22; E21B 43/24
[52] U.S. Cl. .................................. 166/261; 166/274
[58] Field of Search ............. 166/261, 256, 251, 260, 166/258, 274, 275, 272; 252/8.55 D; 260/512 R

[56] References Cited

U.S. PATENT DOCUMENTS

| | | | |
|---|---|---|---|
| 2,535,678 | 12/1950 | Hollander et al. | 260/512 R |
| 2,818,117 | 12/1957 | Koch | 166/256 |
| 2,875,833 | 3/1959 | Martin | 166/268 |
| 3,036,632 | 5/1962 | Koch et al. | 166/256 |
| 3,072,185 | 1/1963 | Bond et al. | 166/261 |
| 3,115,929 | 12/1963 | Emery | 166/261 |
| 3,153,448 | 10/1964 | Dew et al. | 166/261 X |
| 3,294,167 | 12/1966 | Vogel | 166/258 |
| 3,731,741 | 5/1973 | Palmer et al. | 166/275 X |
| 3,799,263 | 3/1974 | Prillieux et al. | 166/275 |
| 4,071,458 | 1/1978 | Allen | 166/274 X |

*Primary Examiner*—Stephen J. Novosad
*Attorney, Agent, or Firm*—Carl G. Ries; Thomas H. Whaley; Walter D. Hunter

[57] ABSTRACT

A two-step method for recovering hydrocarbons from a subterranean formation in which in situ combustion is first initiated in the formation by injection of air, for example, through an injection well, the injection of air is terminated and in a final step a fluid which is preferably water containing a small amount of a sulfonated interfacial tension reducer is injected into the formation whereby the fluid is heated as it passes through the hot formation and finally hydrocarbons are recovered via a production well.

9 Claims, No Drawings

METHOD FOR RECOVERING HYDROCARBONS

BACKGROUND OF THE INVENTION

Field of the Invention

In recovery of petroleum from subterranean reservoirs, it usually is possible to recover only a minor portion of the petroleum in place by the so-called primary recovery techniques, that is, those techniques which utilize only the natural forces present in the reservoir. Thus, a variety of supplemental recovery techniques have been developed in order to increase the recovery of petroleum in such reservoirs. In these supplemental techniques which are commonly referred to as secondary recovery operations, although they may be tertiary in sequence of employment, energy is supplied to the reservoir as a means of moving the fluid within the reservoir to suitable production wells through which they may be withdrawn to the surface of the earth.

Secondary recovery techniques which are showing increasing promise are those which involve in situ combustion. In an in situ combustion process, a portion of the carbonaceous material within the reservoir is burned or oxidized in situ in order to establish a combustion front. The combustion front may be moved through the reservoir by either a direct or inverse drive. In a direct in situ combustion process the combustion is initiated adjacent to one or more injection wells and the resulting combustion front is advanced through the reservoir in the direction of one or more production wells by the introduction of a combustion-supporting gas through the injection well or wells. The combustion front is preceded by a high temperature zone commonly called a retort zone, within which the reservoir petroleum is heated to affect a viscosity reduction and is subjected to distillation and cracking. The hydrocarbon fluids resulting from subjecting the petroleum to such a process are displaced to the production wells where they are withdrawn to the surface of the earth. In an inverse combustion drive, the combustion front is established adjacent to the production well or wells. As the combustion-supporting gas is introduced through the injection well, the combustion front advances countercurrently to the flow of such gas in the direction of the injection well. The in situ combustion procedure, whether inverse or direct, is particularly useful in the recovery of thick heavy oils (petroleum) such as viscous petroleum crude oils and the heavy tar-like hydrocarbons present in tar sands. While these tar-like hydrocarbons may exist within the reservoir in a solid or semi-solid state, they undergo a sharp viscosity reduction upon heating and in an in situ combustion process they behave somewhat like the more conventional petroleum crude oil. In situ combustion also may be employed in the recovery of hydrocarbons from oil shale.

At the termination of an in situ combustion operation the formation retains a great deal of heat as a result of the burning or oxidation of the hydrocarbons and there is a definite need in the art for an efficient process for recovering this heat from the formation.

SUMMARY OF THE INVENTION

This invention provides an improved method for recovering hydrocarbons from an underground reservoir penetrated by an injection well and a production well which comprises:

(a) establishing a burning zone in said reservoir at the face of said injection well, (b) introducing a combustion-supporting gas into said reservoir via said injection well to propagate said zone toward said production well, (c) terminating the injection of the combustion-supporting gas into the reservoir, (d) injecting into the said reservoir via said injection well an aqueous fluid having dissolved therein a small amount of a sulfonated interfacial tension reducer, (e) recovering the displaced hydrocarbons via the said production well.

In another embodiment of this invention the aqueous fluid utilized in step (d) above is saturated with carbon dioxide at the injection pressure which generally will vary from about 500 to about 3000 or more psig.

DETAILED DESCRIPTION OF THE INVENTION

The present invention may be carried out utilizing any suitable injection and production system. The injection and production systems may comprise one or more wells extending from the surface of the earth into the subterranean reservoir. Such injection and production wells may be located and spaced from one another in any desired pattern. For example, a line drive pattern may be utilized in which a plurality of injection wells and a plurality of production wells are arranged in rows which are spaced horizontally from one another. Exemplary of other patterns which may be used are the so-called circular drive patterns in which the injection system comprises a central injection well and the production system comprises a plurality of production wells spaced about the injection well. Typical circular drive patterns are the inverted five spot, seven spot, and nine spot patterns. The above and other patterns are well known to those skilled in the art and for a more detailed description of such patterns reference is made to Uren, L. C., Petroleum Production Engineering-Oil Field Exploitation, Second Edition, McGraw, Hill Book Company Incorporated, New York and London, 1939. While the well patterns described in Uren are with reference to water flooding operations, it will be recognized that such patterns are also applicable to the procedure described herein.

The in situ combustion step in the process of this invention is carried out by a conventional manner using known techniques. For example, a combustion supporting gas such as oxygen as contained in air or a mixture of air and oxygen, for example, is injected into the injection well or wells and is forced through the formation to the production wells. Next, ignition of reservoir hydrocarbons and the oxygen or air and oxygen mixture is initiated by conventional methods and once combustion is attained the combustion front is propagated through the formation toward the production wells. As this in situ combustion operation proceeds, the heat from the operation heats the formation and lowers the viscosity of the in-place hydrocarbons which are moved toward the production wells where they are produced.

After the first step in the process of this invention, i.e., the in situ combustion step, has been operated for a period of about 30 to about 120 days or more and after the combustion zone has propagated for some distance away from the well bore, i.e., from about 10 to about 100 ft. or more, injection of the combustion-supporting gas, which can be air, an air and oxygen mixture, etc. is terminated and, if desired, the unconsumed combustion-supporting gas behind the combustion zone can be displaced using an inert gas such as nitrogen, carbon dioxide, etc. At the conclusion of the in situ combustion step a great deal of heat remains retained by the rock comprising the formation.

In the next step of the process of this invention which is a heat recovery step, an aqueous fluid which is preferably water having dissolved therein a small amount of a sulfonated interfacial tension reducer is introduced into the hot formation via the injection well. The water injected into the hot formation in this step is all or partially converted into steam which displaces more of the in-place oil through the formation and results in the recovery of a substantial quantity of additional oil over that which would be recovered if the process were terminated at the end of the in situ combustion step.

The water injected via the injection well in the second step of the process of this invention will contain dissolved therein from about 0.01 to about 5.0 weight percent or more of an interfacial tension reducer in order to increase the oil recovery. Aqueous fluids containing an alkaline agent may also be injected via the injection well in the process of this invention. Such fluids are prepared by the addition of an alkali metal hydroxide such as sodium hydroxide or potassium hydroxide to the water in an amount sufficient to give a concentration of about 0.01 to about 0.5 weight percent of the alkali metal hydroxide.

Interfacial tension reducers which are highly useful in the process of the invention include sulfonated compounds of the formula:

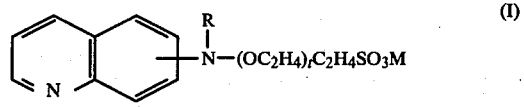

wherein t is a number of from 3 to about 40, M is selected from the group consisting of hydrogen, sodium, potassium and ammonium and R is selected from the group consisting of hydrogen and $-(OC_2H_4)_sC_2H_4SO_3M$, where s is a number of from 3 to about 40 and M has the same meaning as previously described.

Interfacial tension reducers of this type can be formed by first reacting an aminoquinoline such as 5-aminoquinoline, 6-aminquinoline, etc. with ethylene oxide in the presence of a catalyst such as sodium hydroxide to form the corresponding ethoxylated aminoquinoline (II) which in turn is reacted, for example, with chlorosulfonic acid to yield the sulfated ethoxylated aminoquinoline (III). Reaction of Compound III with sodium hydroxyethane sulfonate in the presence of sodium hydroxide as described by Hollander in U.S. Pat. No. 2,535,678 gives the desired sulfonated ethoxylated quinoline (Compound I).

Ordinarily, a conventional, high temperature in situ combustion reaction completely depletes the portion of the formation through which the combustion zone passes. Accordingly, little or no hydrocarbons will be recovered from the zones depleted by in situ combustion by the second step of this process. The embodiments of this process wherein additional hydrocarbons are recovered by the heat scavenging portion of this process are as follows.

(1) In most applications, an in situ combustion front depletes only a fraction of the total vertical thickness of the formation, leaving significant amounts of hydrocarbon in layers above and/or below the zone or zones depleted by the combustion front. In this instance it is possible to inject air and ignite to perform an in situ combustion operation, and continue injecting air until the combustion front has traveled most of the distance from the injection well to the production well, and thereafter inject the aqueous fluid containing the sulfonated interfacial tension reducing chemical into the formation and achieve recovery of additional hydrocarbons from the formation. In this instance, hydrocarbons recovered from the second step of this process are derived from the portions of the formation between the wells bypassed by the in situ combustion front.

(2) In another embodiment, air is injected until the combustion front has passed only a portion of the distance between the injection well and the production well. Hydrocarbons are recovered by this process, and substantial amounts of heat are generated in the combustion process. Much of the heat generated is stored in the porous formation matrix, e.g. the rock or sand of which the formation is comprised. After the combustion front has passed from 10 to 90 percent and preferably from 25 to 75 percent of the distance between the injection and production wells, air injection is terminated and the aqueous heat scavenging fluid containing the sulfonated surface tension reducing agent is injected into the formation. In this embodiment, hydrocarbons are recovered during this second phase from the portions of the formation bypassed by the combustion front as well as from those portions of the formation beyond the point traversed by the combustion front.

(3) Even where the combustion front passes to or near the production well and achieves effective vertical conformance, this invention may be used. A very large amount of heat remains stored in the formation rock in this instance. The heat-scavenging aqueous fluid containing the sulfonated interfacial tension reducing agent is injected into the depleted portion of the formation and then recovered and reinjected into a different portion of the same or a nearby different hydrocarbon-bearing formation above or below the first formation.

The present invention will be more fully understood by reference to the following description of one embodiment thereof which is to be considered not limitative.

EXAMPLE

A hydrocarbon bearing formation is penetrated by an injection well which is spaced apart from a production well. The wells are of a suitable type for carrying out a procedure of forward in situ combustion for recovering hydrocarbons from the formation. The injection well and production well each has a casing which extends from the earth's surface down into the lower portions of the formation. The bottom of the casing of each well is sealed by a casing shoe. The casing of the injection well is perforated over a 10 ft. length opposite the hydrocarbon bearing formation and in communication therewith. Likewise, the production well has a single set of perforations through the casing opposite the hydrocarbon bearing formation. An in situ combustion front is begun by injecting air into the casing of the injection well and then into the formation via the casing perforations. The hydrocarbons in the reservoir are ignited by conventional techniques such as by using an electrical igniter. Air injection is continued for about 45 days and at the end of that time air injection is terminated. In the next step water having dissolved therein 0.5 weight percent of an interfacial tension reducer of the formula:

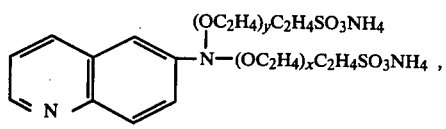

where the sum of $x+y$ is about 16, at a pressure of about 2600 psig is injected via the casing of the injection well and through the casing perforations into the formation at the rate of 1.25 barrels/minute for a period of about 45 days during which time hydrocarbons displaced through the formation enter the production well through the casing perforations and are recovered via the production well.

What is claimed is:

1. A method for recovering hydrocarbons from an underground reservoir penetrated by an injection well and a production well which comprises:
   (a) establishing a burning zone in said reservoir at the face of said injection well,
   (b) introducing a combustion-supporting gas into said reservoir via said injection well to propagate said zone toward said production well,
   (c) terminating the injection of the combustion-supporting gas into the reservoir,
   (d) injecting into the said reservoir via said injection well an aqueous drive fluid having dissolved therein a small amount of a sulfonated interfacial tension reducer,
   (e) recovering the displaced hydrocarbons via the said production well, and wherein the said sulfonated interfacial tension reducer has the formula:

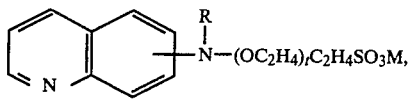

wherein t is a number of from 3 to about 40, and M is selected from the group consisting of hydrogen, sodium, potassium and ammonium, R is selected from the group consisting of hydrogen and $—(OC_2H_4)_sC_2H_4SO_3M$, where s is a number of from 3 to about 40 and M has the same meaning as previously described.

2. The method of claim 1 wherein in step (b) the combustion-supporting gas is air.

3. The method of claim 1 wherein in step (b) the combustion-supporting gas is a mixture of air and oxygen.

4. The method of claim 1 wherein in step (d) the aqueous fluid is water.

5. The method of claim 1 wherein in step (d) the aqueous fluid has dissolved therein about 0.01 to about 5.0 weight percent of the sulfonated interfacial tension reducer.

6. The method of claim 1 wherein the said aqueous fluid contains about 0.01 to about 0.5 weight percent of an alkaline agent selected from the group consisting of sodium hydroxide and potassium hydroxide.

7. The method of claim 1 wherein the aqueous fluid is saturated with carbon dioxide at injection pressure.

8. A method as recited in claim 1 wherein air injection is terminated after the combustion front has traveled from 10 to 90 percent of the distance between the injection and production well.

9. A method as recited in claim 1 comprising continuing injecting air until the combustion front has traveled to a point ar or near the production well after which the aqueous dirve fluid is injected into the formation to scavenge heat therefrom, recovering the fluid from the formation and reinjecting the fluid into another section of formation to recover hydrocarbons therefrom.

* * * * *